1

3,517,038
CARBOXYALKYLSILOXANE ESTERS OF CASTOR OIL AND CASTOR OIL DERIVATIVES
Norman G. Holdstock, Scotia, N.Y., assignor to General Electric Company, a corporation of New York
No Drawing. Filed Dec. 1, 1967, Ser. No. 687,119
Int. Cl. C07c 143/90
U.S. Cl. 260—400
11 Claims

ABSTRACT OF THE DISCLOSURE

Carboxyalkylsiloxanes are joined to a castor oil derivative through an ester linkage. A compound within the scope of the disclosure is made by reacting castor oil with a chloroacylpropyldimethylsilyl end-stopped siloxane having the formula:

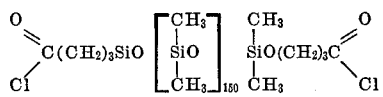

Compositions within the scope of the disclosure are useful in auto polishes.

---

This invention relates to carboxyalkylsiloxane esters of castor oil and castor oil derivatives. Compounds within the scope of the present invention contain one or more siloxane blocks joined to radicals derived from castor oil. When both the castor oil radicals and the siloxane block radicals have a valence of 2 or more, the compounds can be polymers containing alternate castor oil derivative block radicals, and siloxane block radicals. Compounds within the scope of the present invention are useful in many applications where it is desired to combine the desirable properties of castor oil with the desirable properties of a siloxane. For example, the reaction product of castor oil and a siloxane containing a carboxyalkyl group is useful in a polish composition such as an auto polish or furniture polish in that it gives the sheen and luster characteristic of castor oil, the ease of rub-out which is characteristic of the polysiloxane and a hard, tack-free surface which does not pick up dust.

Castor oil used alone, while it does provide a sheen and luster, leaves the surface with the sticky feel of chewing gum. Other polishes on the market today also provide a sheen and luster with ease of rub-out as do the compositions of the present invention. This is accomplished, however, by using a low viscosity polish, and the shine does not last because the low viscosity polish wicks into the base or rubs off.

The compositions of the present invention are defined by the average unit formula:

(1)
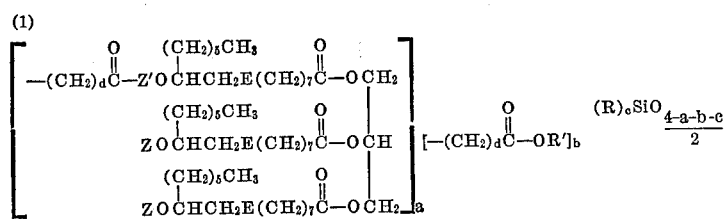

where R is selected from the class consisting of hydrogen, alkyl radicals, alkenyl radicals, aryl radicals, cycloaliphatic radicals, aralkyl radicals and halogenated derivatives of the above radicals; R' is selected from the class consisting of hydrogen, alkyl radicals, alkenyl radicals, cycloalphatic radicals, aralkyl radicals and halogenated derivatives of the above radicals; E is a member selected from the class consisting of $-CH_2CH_2-$, $-CH=CH-$, and

where A and D are selected from the class consisting of hydrogen, halide, and sulfonate radicals, Z is selected from the class consisting of H—, $HSO_3-$, $$HO(R''O)_eR''-$$

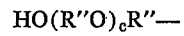
and
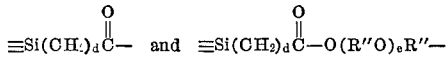

radicals, and the indicated single valence of the Z radicals constitutes part of the bond to the carbinol oxygen atom of the castor oil derivative radical; $\equiv Si$ is a silicon atom of an adjacent siloxane block falling within the scope of the average unit formula, and R'' is an alkylene radical having 2 to 4 carbon atoms; Z' is selected from the class consisting of a carbon to oxygen bond and a $$-O(R''O)_eR''-$$

radical, attached to the carbinol oxygen atom of castor oil derivative radical through the R'' to form an ether and to the

radical to form an ester; $a$ has a value of 0.001 to 0.25, $b$ has a value of 0 to 1, $c$ has a value of 1 to 2.25, the sum of $a$ plus $b$ plus $c$ has a value of 2.002 to 2.5, $d$ is an integer having a value of 2 or 3, and $e$ has a value of 0 to 10,000.

When Z includes a divalent radical joining two silicon atoms in Formula 1, the composition of the present invention can be a block copolymer having alternate blocks of siloxane chains and radicals derived from castor oil. When Z includes a divalent polyether-containing radical joining two silicon atoms, the composition of the present invention can be a block terpolymer having alternate siloxane, polyether and castor oil radical blocks.

The castor oil or derivative thereof used in making the compositions of the present invention is generally trifunctional. The carboxyalkylsiloxane is preferably difunctional. In order to prevent gel formation, the quantity of the carboxyalkylsiloxane is either limited or some of the functional groups of one of the reactants are blocked, for example, by capping one or more of the hydroxyl groups of the castor oil or castor oil derivative with an alkyl monoester of a carboxyalkyldimethylsilyl end-stopped linear siloxane.

A number of compositions were made in which all of the hydroxyl groups of the castor oil or castor oil derivative were capped with an alkyl monoester of a carboxyalkyldimethylsilyl end-stopped linear siloxane, and the compositions when used in polish formulations gave excellent results.

The compositions of Formula 1 are characterized by the presence of one or more radicals derived from castor oil attached to each siloxane block through a carboxyalkyl ester radical formed by the reaction of a hydroxyl group of the castor oil or derivative thereof with a carboxyalkylene or haloacylalkylene radical of a siloxane. The alkylene radical is attached to the siloxane by a carbon-silicon bond. Some radicals derived from castor oil which can be bonded through an ester linkage to a siloxane are derivatives of the following; castor oil, castor oil which has been partially oxidatively polymerized, glycerol esters containing one or more ricinoleate radicals and one or more hydroxy stearate radicals per molecule, sulfonated and sulfated castor oil and alkoxylated castor oil.

Compounds within the scope of Formula 1 are further characterized by the presence of one or more carboxyalkyl radicals attached to a silicon atom of a siloxane through an alkylene radical. At least one of the carboxyalkyl radicals present on each siloxane block is bonded to a radical derived from castor oil. The remaining carboxyalkyl groups, if any, can be carboxylic acid radicals or esters formed by reaction of the carboxylic acid radicals with alcohols.

The carboxyalkyl radical is further characterized by the fact that the carboxyl groups is attached to silicon through 2 or 3 carbon atoms, thus the carboxyalkyl radical can be a beta-carboxyethyl radical, a beta-carboxypropyl radical or a gamma-carboxypropyl radical.

Among the radicals represented by R of Formula 1 can be mentioned, for example, hydrogen, alkyl radicals, e.g., methyl, ethyl, propyl, butyl, octyl, etc. radicals; cycloalkyl radicals, e.g., cyclohexyl, cycloheptyl, etc. radicals; aryl radicals, e.g., phenyl, tolyl, naphthyl, xylyl, etc. radicals; aralkyl radicals, e.g., benzyl, phenylethyl, etc. radicals; alkenyl and cycloalkenyl radicals, e.g., vinyl, allyl, cyclohexenyl, etc. radicals; and halogenated derivatives of the aforementioned radicals, e.g., chloromethyl, chlorophenyl, dibromophenyl, etc. radicals. In the preferred embodiment of my invention, the R radical is an alkyl or aryl radical with the methyl or the phenyl radical being the specific preference. Among the radicals represented by R' of Formula 1 can be mentioned, for example, hydrogen, alkyl radicals, e.g., methyl, ethyl, propyl, butyl, octyl, etc. radicals; cycloalkyl, e.g., cyclohexyl, cycloheptyl, etc. radicals; aralkyl radicals, e.g., benzyl, phenylethyl, etc. radicals, alkenyl and cycloalkenyl radicals, e.g., allyl, cyclohexenyl, etc. radicals and halogenated derivatives of the aforementioned radicals, e.g., chloromethyl, chlorobenzyl, and chloroallyl radicals.

The R' radical can be derived from any alcohol capable of entering an esterification reaction, but is preferably a lower alkyl radical having 1 to 7 carbon atoms.

Compounds within the scope of Formula 1 can be readily formed by the esterification of a compound within the scope of the average unit formula:

(2) 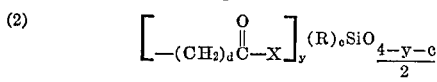

with a compound within the scope of formula:

(3) 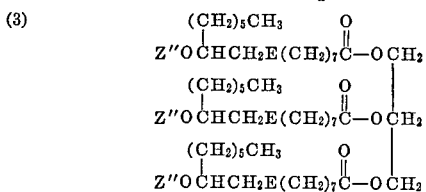

where E, R, c and d are as previously defined, X is selected from the class consisting of hydroxyl, fluoride, chloride, bromide and iodide, Z" is selected from the class consisting of H—, $HSO_3$—, and $HO(R''O)_eR''$— radicals, with the further limitation that a maximum of two Z" radicals per molecule of the compound of Formula 2 can be $HSO_3$— radicals, R" and e are as previously defined, y has a value of 0.001 to 1 and the sum of c plus y has a value of 2.002 to 2.5.

The preferred method of conducting the above reaction is by use of the acid chloride. The acid chloride within the scope of Formula 2 is prepared by reacting a carboxyalkylsiloxane with thionyl chloride. The conversion of the carboxyalkylsiloxane to the acid chloride is best run with a 150% excess or more of thionyl chloride.

A siloxane containing carboxyalkyl groups within the scope of Formula 2 can be readily formed by the hydrolysis and condensation of a mixture of a diorganodichlorosilane having the formula:

(4)  $R_2SiCl_2$ and/or a triorganochlorosilane having the formula:

(5)  $R_3SiCl$ with a cyanoalkyldichlorosilane having the formula:

(6) 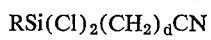 $RSi(Cl)_2(CH_2)_dCN$ and/or a cyanodialkylchlorosilane having the formula:

(7) 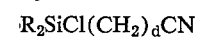 $R_2SiCl(CH_2)_dCN$ where R and d are as previously defined. Details of the hydrolysis and condensation reaction can be found in U.S. Pat. 3,182,076 of Holdstock.

The castor oil and derivatives thereof used to make the compounds and copolymers of the present invention are well known in the art. These materials are derived from castor oil. Castor oil is composed in the main of the triglyceride of ricinoleic acid and has the formula:

(8) 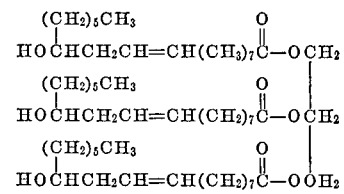

The compounds of the present invention owe their existence to the hydroxy groups of this compound, which react with the carboxy or acid halide groups of the siloxane. The hydroxyl groups of the castor oil or the polyether derivative can also be transesterified by reaction with an ester of a carboxyalkylpolysiloxane.

The practical temperature range of the esterification reaction can vary from room temperature, i.e., about 20° C. to 300° C., dependent upon reactants, time, temperature, solvents, catalyst, etc.

When a siloxane containing acyl halide groups is used to form an ester, the time and temperature requirements are reduced, four hours at room temperature being sufficient for the usual reaction.

Generally speaking, 10 hours at 100° C. is sufficient for an esterification reaction using a carboxylic acid, or an ester exchange reaction using a carboxylic acid ester. The time and temperature are dependent upon the removal of by-product water or alcohol formed during the esterification or ester exchange reaction. At 100° C., this is easily accomplished at atmospheric pressure.

When the acyl halide is used to form the ester, an esterification catalyst is not required; however, an acid acceptor is generally employed to remove by-product acid from the system.

When the direct esterification reaction employing the carboxylic acid or the ester exchange reaction employing the carboxylic acid ester is employed to form the products of the present invention, acidic catalysts may be used, such as para-toluene sulfonic acid, sodium acid sulfate, hydrochloric acid, sulfuric acid, acid clays, etc. Generally speaking, small amounts of any acid can be employed. Metals and metal salts such as tin, lead, zinc, stannous chloride, tetrabutyl titanate, etc., may also be employed. In the ester exchange reaction, an alkaline catalyst may also be used, such as sodium methoxide and aluminum ethoxide.

Solvents which may be used include the usual inert hydrocarbon solvents, such as benzene, toluene, xylene, etc.

As can be seen from the following examples, the molar ratios of reactants can be widely varied. There is no requirement that stoichiometric quantities of reactants be employed. As the castor oil compound is trifunctional and the siloxane employed is generally difunctional, it is preferred that stoichiometric quantities not be employed to avoid excessive cross-linking. An excess of one or the other of the reactants is preferred. In the case of the polysiloxane, up to a 10 fold excess or more, based upon equivalent weights, may be employed, as unreacted siloxane aids in ease of rub-out when the composition is used in a polish.

Up to a 6 fold excess of castor oil over that required to react with all of the reactive groups of the siloxane may be employed before an appreciable sticky feel is developed in the polish employing the composition.

While a blocking ester is not required when an excess of a carboxypropyldimethyl end-stopped polysiloxane is employde, it is preferred in order to enhance the water repellency characteristics of the product when it is used in a polish composition. Preferably, a blocking ester group caps every carboxy group not reacted with castor oil. The esterification reaction employed to cap the unreacted carboxy group generally utilizes a 3 to 10 fold excess of alcohol in order to decrease the time of reaction and to drive the reaction to as close as possible to 100% completion.

The following examples are illustrative of the practice of my invention and are not intended for purposes of limitation. All parts are by weight.

The esterification reactions were conducted in a 3 necked flask fitted with a thermometer, a stirrer, a Barrett trap, and a condenser.

EXAMPLE 1

To 20 grams of a carboxypropyldimethylsilyl end-stopped siloxane of the formula:

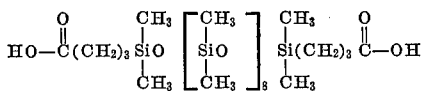

were slowly added with stirring, 100 grams of glyceryltriricinoleate, 100 grams of toluene and 1 gram of para-toluene sulfonic acid catalyst. This reaction mixture was heated for about 10 hours at the reflux temperature of the toluene solvent and water was trapped from the distillate as it formed. The resulting product was cooled, neutralized with sodium bicarbonate, and filtered to remove solids. The reaction mixture was then heated to a temperature of about 100° C. at 10 mm. to distill off the toluene, resulting in a product within the scope of the present invention, which is a clear, yellow fluid. The primary reaction product is defined by Formula 1 wherein R is methyl, E is —CH=CH—, Z is H—, Z' is a carbon to oxygen bond, $a$ has a value of 0.2, $b$ has a value of 0, $c$ has a value of 2, the sum of $a$ plus $b$ plus $c$ has a value of 2.2, and $d$ has a value of 3.

EXAMPLE 2

To 100 grams of a carboxypropyldimethylsilyl chain-stopped siloxane of the formula:

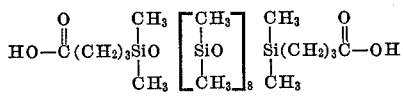

were slowly added with stirring 76 grams of glyceryltriricinoleate, 100 grams of toluene and 1 gram of para-toluene sulfonic acid catalyst. This reaction mixture was heated for about 10 hours at the reflux temperature of the toluene solvent (120° C.) and water was trapped from the distillate as it formed. The resulting product was cooled, neutralized with sodium bicarbonate and filtered to remove solids. The reaction mixture was then heated to a temperature of about 100° C. at 10 mm. to distill off the toluene, resulting in a clear, yellow fluid. The principal constituent of the fluid is copolymer containing one or more siloxane blocks and is defined by Formula 1 when R is methyl, E is —CH=CH—, one of the Z radicals is H— and the other Z radical is

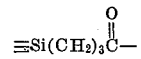

Z' is a carbon to oxygen bond, $a$ has a value of 0.2, $b$ has a value of 0, $c$ has a value of 2, the sum of $a$ plus $b$ plus $c$ has a value of 2.2, and $d$ has a value of 3.

EXAMPLE 3

To the 3 necked flask, 100 grams of pale blown castor oil was added. The pale blown castor oil was a mixture of the monomer and a small amount of the dimer of glyceryltriricinoleate. The molecules are joined by the interreaction of the olefinic linkages of two glyceryltriricinoleate molecules. The castor oil used was "Baker Pale No. 4" which has an acid value of 16, a Wijs iodine value of 69, a hydroxyl value of 157, and a saponification value of 212. To the pale blown castor oil was added with stirring, 20 grams of a carboxypropyldimethyl end-stopped siloxane having the formula:

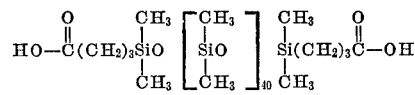

100 grams of toluene, and 1 gram of para-toluene sulfonic acid catalyst. This reaction mixture was heated for 10 hours at the reflux temperature of the toluene solvent (120° C.) and water was trapped from the distillate as formed. The resulting product was cooled, neutralized with sodium bicarbonate and filtered to remove solids. The reaction mixture was then heated to a temperature of 100° C. at a reduced pressure of 10 mm. to distill the toluene, resulting in a composition within the scope of the present invention which is a clear, dark brown fluid. The principal component of the composition is a siloxane within the scope of Formula 1 when R is methyl, E is —CH=CH—, Z' is a carbon to oxygen bond, Z is H—, $a$ has a value of 0.048, $b$ has a value of 0, $c$ has a value of 2, the sum of $a$ plus $b$ plus $c$ has a value of 2.048, and $d$ has a value of 3.

EXAMPLE 4

To 50 grams of pale blown castor oil (the same as was used in Example 3 was slowly added with stirring 100 grams of a carboxypropyldimethyl chain-stopped siloxane having the average formula:

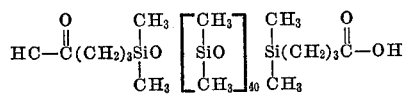

100 grams ol toluene and 1 gram of para-toluene sulfonic acid catalyst. This reaction mixture was heated for about 10 hours at the reflux temperature of the toluene solvent and water was trapped from the distillate as it formed. The resulting product was cooled, neutralized with sodium bicarbonate and filtered to remove solids. The reaction mixture was then heated to a temperature of about 100° C. at a reduced pressure of 10 mm. to distill the toluene, resulting in a clear, dark brown fluid. The principal constituent of the fluid is a siloxane within the scope of Formula 1 when R is methyl, E is —CH=CH—, Z is H—, Z' is a carbon to oxygen bond, $a$ has a value of 0.048, $b$ has a value of 0, $c$ has a value of 2, the sum of $a$ plus $b$ plus $c$ has a value of 2.048, and $d$ has a value of 3.

EXAMPLE 5

To 200 grams of a carboxypropyldimethyl chain-stopped siloxane having the average formula:

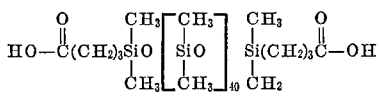

was slowly added 20 grams of calcium carbonate and 33 grams of thionyl chloride with stirring over a period of ½ hour. The reaction mixture was allowed to stand for 4 hours. The reaction mixture was then heated to a temperature of 50° C. at 10 mm. pressure to distill off the excess thionyl chloride.

To the resulting acid chloride base oil was slowly added with stirring a mixture of 100 grams of blown castor oil of the same type as was used in Example 3, 70 grams of pyridine and 150 grams of toluene. The reaction mixture was stirred for 2 hours. An additional 10 grams of pyridine was added and stirring was continued for eight additional hours. The reaction mixture was filtered to remove the precipitated pyridine hydrochloride. The reaction mixture was then heated to a temperature of about 100° C. at 10 mm. to distill the toluene, resulting in a clear, yellow, viscous fluid. The principal constituent of the fluid is a siloxane within the scope of Formula 1 when R is methyl, E is —CH=CH—, Z is H—, Z' is a carbon to oxygen bond $a$, has a value of 0.048, $b$ has a value of 0, $c$ has a value of 2, the sum of $a$ plus $b$ plus $c$ has a value of 2.048, and $d$ has a value of 3.

EXAMPLE 6

To 100 grams of the acid chloride of a carboxypropyldimethyl chain-stopped siloxane of the formula:

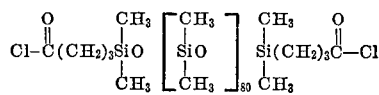

was slowly added with stirring over a period of ½ hour a solution of 100 ml. of toluene, 3 grams of pyridine and 13 grams of a castor oil derivative which has had its hydroxyl group replaced with the polyether groups. The derivative has the average formula:

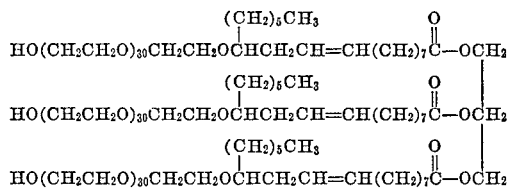

The reaction mixture was maintained at reflux and stirred for one hour. To the reaction mixture was added 10 grams of isopropyl alcohol for the purpose of esterifying the remaining acid chloride groups and the reaction mixture again was maintained at reflux temperature and stirred for one hour. The reaction mixture was then filtered to remove the precipitated pyridine hydrochloride. The reaction mixture was then heated to a temperature of 100° C. at 10 mm. to distill the toluene and excess isopropyl alcohol. The product was a clear, viscous fluid. The principal component of the product was a siloxane within the scope of Formula 1 when R is a methyl radical, R' is an isopropyl radical, E is

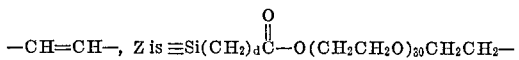

—CH=CH—, Z is ≡Si(CH₂)₃C—O(CH₂CH₂O)₃₀CH₂CH₂—

Z' is —O(CH₂CH₂O)₃₀CH₂CH₂—, $a$ has a value of 0.0125, $b$ has a value of 0.0125, $c$ has a value of 2, the sum of $a$ plus $b$ plus $c$ has a value of 2.025, and $d$ has a value of 3.

EXAMPLE 7

A polish composition was formulated. Part A was made by blending 30 grams of the clear, viscous fluid of Example 6 with 30 grams of a trimethylsilyl chain-stopped siloxane fluid having the average formula:

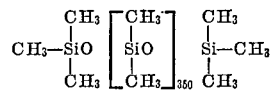

To this blend was added 150 grams of mineral spirits and 150 grams of a high flash point naphtha having a boiling range of 240–290° F.

Part B was formulated by mixing 10 grams of morpholine, 50 grams of a 1% aqueous solution of a high molecular weight carboxyvinyl polymer having an average of 1,000 carboxyvinyl units, 50 grams of an aqueous 1% triethanolamine solution and 410 grams of water.

Part A was added to Part B with rapid high shear agitation. The agitation was continued until a uniform blend was obtained. To the blend was then added, again with high shear agitation, 100 grams of extremely finely divided calcined diatomaceous earth. The agitation was continued until a uniform blend was obtained.

To the blend was added, with high shear agitation, 100 grams of extremely finely divided calcined diatomaceous earth. The agitation was continued until a uniform blend was obtained.

A similar composition was formulated for comparison purposes which was identical in all respects except that the fluid product of Example 6 was replaced with 30 grams of the trimethylsilyl chain-stopped siloxane.

The two polish formulations were applied to standard black enameled test panels. The polish containing the product of Example 6 as compared with the standard, gave better film clarity, better depth of gloss and comparable rub-out.

EXAMPLE 8

To 400 grams of an acid chloride derivative of a carboxypropyldimethylsilyl end-stopped siloxane of the average formula:

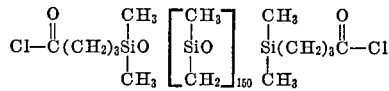

was slowly added with stirring 400 ml. of toluene, 5 grams of pyridine, 50 grams of methyl alcohol and 10 grams of the partially dimerized Baker Pale No. 4 castor oil described in Example 3. The reaction mixture was maintained at reflux temperature and stirred for 10 hours, cooled and filtered through fuller's earth to remove the precipitated pyridine hydrochloride. The reaction mixture was then heated to a temperature of about 100° C. at 10 mm. to distill the toluene solvent and excess methyl alcohol. The product was a clear, viscous fluid. The principal component of the product is defined by Formula 1 when R is a methyl radical, R' is a methyl radical, E is —CH=CH—.

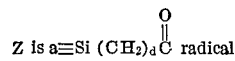

Z is a≡Si(CH₂)₃C radical

Z' is a carbon to oxygen bond, $a$ has a value of 0.0067, $b$ has a value of 0.0067, $c$ has a value of 2, the sum of $a$ plus $b$ plus $c$ has a value of 2.013, and $d$ has a value of 3.

EXAMPLE 9

A polish composition was formulated. Part A was made by blending 30 grams of the clear, viscous fluid product of Example 8 with 30 grams of a trimethylsilyl chain-stopped siloxane having the average formula:

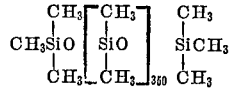

To this blend was added 150 grams of mineral spirits and 150 grams of a high flash point naphtha having a boiling range of 240–290° F.

Part B was formulated by mixing 10 grams of morpholine, 50 grams of an aqueous 1% solution of a carboxyvinyl polymer having the average of 1,000 carboxyvinyl units per molecule, 50 grams of an aqueous 1% triethanolamine solution and 410 grams of water.

Part A was added to Part B with rapid high shear agitation. The agitation was continued until a uniform blend was obtained. To the blend was then added with high shear agitation 100 grams of extremely finely divided calcined diatomaceous earth. The agitation was continued until a uniform blend was obtained.

A standard blend was formulated for comparison purposes which was identical in all respects except that the fluid product of Example 8 was replaced with 30 grams of the trimethylsilyl chain-stopped siloxane. The two polish formulations were applied to standard black enameled test panels. The polish containing the product of Example 8 as compared with the standard gave better depth of gloss, better film clarity and comparable rub-out.

The test panels were allowed to stand in the laboratory for three days. The panel polished with the polish containing the product of Example 8 retained its gloss and film clarity and was free of dust. The panel polished with the standard blend was covered with dust.

EXAMPLE 10

To 100 grams of an acid chloride derivative of a chloroacylpropyldimethylsilyl end-stopped siloxane containing an average of 5 randomly distributed methyl hydrogen siloxane units and 19.2 dimethylsiloxane units per molecule, having the formula:

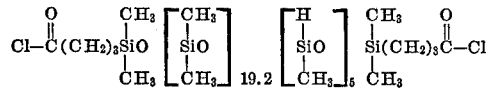

was added with agitation a solution of 16 grams of castor oil and 8 grams of pyridine dissolved in 200 ml. of dry toluene. While maintaining agitation, the flask and its contents were heated to reflux and maintained at reflux for an additional half hour. Pyridine hydrochloride was then removed by filtering the reaction mixture through fuller's earth. The reaction mixture was then heated to a temperature of 100° C. at 10 mm. to remove the toluene by distillation.

An infrared spectrum of the fluid produced as compared with the infrared spectrum of the initial reaction mixture showed the disappearance of the —COCl band at 5.5 microns and the strengthening of the —COOR band at 5.75 microns. The —SiH band was present in the final product at 4.6 microns and 11.0 microns. The product was a clear, yellow-orange fluid having a viscosity of 540 centistokes at 77° C. The principal component of the product was a polymer containing three or more siloxane blocks. The principal component falls within the scope of Formula 1 when R is a methyl radical, R' is H—, E is —CH=CH—,

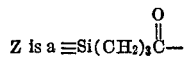

radical, Z' is a carbon to oxygen bond, $a$ has a value of 0.04, $b$ has a value of 0.06, $c$ has a value of 2, the sum of $a$ plus $c$ has a value of 2.076, and $d$ has a value of 3.

EXAMPLE 11

To 100 grams of an acid chloride derivative of a carboxypropylidimethylsilyl end-stopped siloxane containing an average of 200 dimethylsiloxy units in the chain and having the formula:

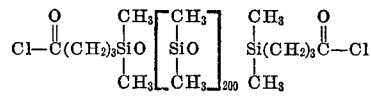

was added, with agitation, a solution of 10 grams of pyridine, 8 grams of isopropyl alcohol and 11 grams of a partially sulfonated and sulfated castor oil, dissolved in 500 ml. of toluene.

The sulfonated and sulfated castor oil was made by reacting castor oil with sulfuric acid until the Wijs iodine value of the castor oil reached 69 and the hydroxy value of the castor oil reached 157.

While maintaining agitation, the flask and its contents were heated to reflux and maintained at reflux temperature for three hours. The reaction mixture was cooled and pyridine hydrochloride was removed by filtering the reaction mixture through fuller's earth. The reaction mixture was then heated to a temperature of 100° C. at 10 mm. to remove the toluene by distillation. The reaction product was clear, light in color, and had a viscosity of 1500 centistokes at 77° F. The principal reaction product contained at least two castor oil derivative radicals and at least one siloxane block. The product falls within the scope of Formula 1 when R is a methyl radical, E is a mixture of —CH=CH— and

where A and D are mixtures of hydrogen and sulfonate radicals, Z is a mixture of H—, HSO₃— and

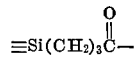

radicals, Z' is a carbon to oxygen bond, $a$ has a value of 0.01, $b$ has a value of 0, $c$ has a value of 2, the sum of $a$ plus $b$ plus $c$ has a value of 2.01 and $d$ has a value of 3.

EXAMPLE 12

A polish composition was formulated. Part A was made by blending 30 grams of the clear, light viscous product of Example 11 with 30 grams of a trimethylsilyl chain-stopped siloxane having the average formula:

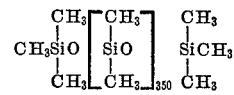

To this blend was added 150 grams of mineral spirits and 150 grams of a high flash point naphtha having a boiling range of 240–290° F.

Part B was formulated by mixing 10 grams of morpholine, 50 grams of an aqueous 1% solution of a high molecular weight carboxyvinyl polymer having an average of 1,000 carboxyvinyl units per molecule, 50 grams of an aqueous 1% trimethanolamine solution and 410 grams of water.

Part A was added to Part B with rapid high shear agitation. The agitation was continued until a uniform blend was obtained. To the blend was then added with high shear agitation 100 grams of extremely finely divided calcined diatomaceous earth. The agitation was continued until a uniform blend was obtained. The polish composition was tested and found to have excellent gloss and rub-out properties.

EXAMPLE 13

To 100 grams of the acid chloride derivative of a carboxypropyldimethyl end-stopped siloxane of the formula:

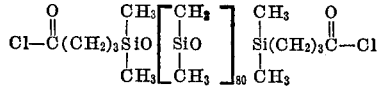

were slowly added with stirring over a period of one hour a solution of 10 grams of a hydroxy stearate triester of glycerol and 3 grams of pyridine in 100 ml. of toluene. The reaction mixture was maintained at reflux and stirred for 8 hours. The reaction product solution was filtered to remove the precipitated pyridine hydrochloride. The reaction product solution was then heated to a temperature of 100° C. at 10 mm. to distill the toluene. The copolymer produced was a waxy material. The copolymer falls within the scope of Formula 1 when R is methyl, E is —$CH_2CH_2$—

Z is a 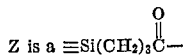

radical, Z' is a carbon to oxygen bond, $a$ has a value of 0.024, $b$ has a value of 0, $c$ has a value of 2, the sum of $a$ plus $b$ plus $c$ has a value of 2.024, and $d$ has a value of 3.

What I claim as new and desire to secure by Letters Patent of the United States is:

1. A compound having the average unit formula:

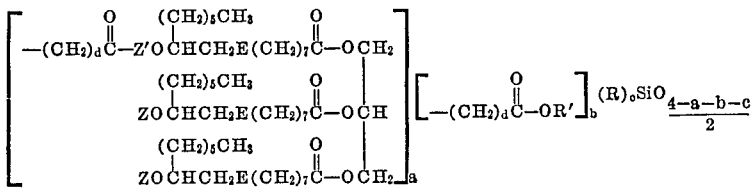

where R is selected from the class consisting of hydrogen, alkyl radicals, alkenyl radicals, aryl radicals, cycloaliphatic radicals, aralkyl radicals and halogenated derivatives of the above radicals; R' is selected from the class consisting of hydrogen, alkyl radicals, alkenyl radicals, cycloaliphatic radicals, aralkyl radicals, and halogenated derivatives of the above radicals; E is a member selected from the class consisting of —$CH_2CH_2$—, —CH=CH— and

where A and D are selected from the class consisting of hydrogen, halide and sulfonate radicals; Z is selected from the class consisting of H—, $HSO_3$—, HO(R″O)$_e$R″—,

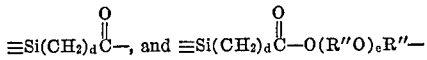

radicals, where ≡Si is a silicon atom of an adjacent siloxane block falling within the scope of the average unit formula, and the single indicated valence of the Z radical constitutes a part of a bond to a carbinol oxygen atom of the castor oil derivative radical, Z' is selected from the class consisting of a carbon to oxygen bond, and a —O(R″O)$_e$R″— radical attached to the carbinol oxygen atom of the castor oil derivative radical through the R″— to form an ether and to the

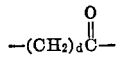

radical to form an ester, R″ is an alkylene radical having 2 to 4 carbon atoms; $a$ has a value of 0.001 to 0.25, $b$ has a value of 0 to 1, $c$ has a value of 1 to 2.25, the sum of $a$ plus $b$ plus $c$ is equal to 2.002 to 2.5, $d$ has a value of 2 to 3, and $e$ has a value of 0 to 10,000.

2. The composition of claim 1 in which E is a —CH=CH— radical, R is a methyl radical, Z is selected from the class consisting of

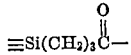

and H— radicals, Z' is a carbon to oxygen bond, $b$ has a value of 0, $c$ has a value of 2, and $d$ has a value of 3.

3. The composition of claim 1 in which E is

—CH=CH—

R is a methyl radical, Z is selected from the class consisting of

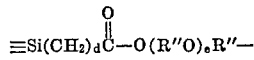

and HO(R″O)$_e$R″— radicals, $b$ has a value of 0, $c$ has a value of 2, $d$ has a value of 3, and $e$ has a value of 0 to 10,000.

4. The composition of claim 1 in which at least one Z per siloxane block is a —$HSO_3$ radical, R is a methyl radical, $b$ has a value of 0, $c$ has a value of 2, and $d$ has a value of 3.

5. The composition of claim 1 in which E is a —CH=CH— radical, R is a methyl radical, Z is selected from the class consisting of

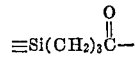

and H— radicals, $a$ and $b$ have the same value, $c$ has a value of 2, and $d$ has a value of 3.

6. The composition of claim 1 in which E is

—CH=CH—

R is a methyl radical, Z is selected from the class consisting of

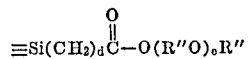

and HO(R″O)$_e$R″— radicals, $a$ and $b$ have the same value, $c$ has a value of 2, $d$ has a value of 3, and $e$ has a value of 0 to 10,000.

7. The composition of claim 1 in which 1 to 2 Z radicals per molecule are —$SO_3H$ radicals, R is a methyl radical, $a$ and $b$ have the same value, $c$ has a value of 2, and $d$ has a value of 3.

8. The composition of claim 1 in which E is selected from the class consisting of —CH=CH— and

—$CH_2CH_2$— radicals, with from 1 to 100% being —$CH_2CH_2$— radicals.

9. The composition of claim 1 in which $a$ has a value of 0.01 to 0.25, $b$ has a value of 0 to 0.25, $c$ has a value of 2, and the sum of $a$ plus $b$ plus $c$ has a value of 2.01 to 2.25.

10. The composition of claim 1 in which $a$ has a value of 0.01 to 0.2, and $b$ has a value equal to the value of $a$, $c$ has a value of 2 and the sum of $a$ plus $b$ plus $c$ has a value of 2.01 to 2.2.

11. A method of preparing a carboxylalkylsiloxane ester containing at least one radical derived from castor oil and at least one carboxylalkylsiloxane radical which comprises esterifying a compound within the scope of the average unit formula:

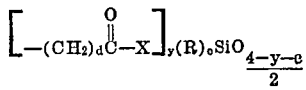

with a compound derived from castor oil within the scope of the formula:

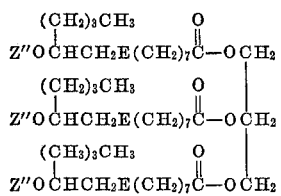

where R is selected from the class consisting of hydrogen, alkyl radicals, alkenyl radicals, aryl radicals, cycloaliphatic radicals, aralkyl radicals and halogenated derivatives of the above radicals; E is a member selected from the class consisting of —$CH_2CH_2$—, —CH=CH—, and

where A and D are selected from the class consisting of hydrogen, halide and sulfonate radicals; X is selected from the class consisting of hydroxyl, fluoride, chloride, bromide and iodide; Z″ is selected from the class consisting of H—, $HSO_3$—, and HO(R″O)R″— radicals with the further limitation that a maximum of two Z″ radicals per molecule of the castor oil derivative can be $HSO_3$— radicals; R″ is an alkylene radical having 2 to 4 carbon atoms; $c$ has a value of 1 to 2.25, $y$ has a value of 0.001 to 1 and the sum of $c$ plus $y$ has a value of 2.002 to 2.5.

No references cited.

ELBERT L. ROBERTS, Primary Examiner

U.S. Cl. X.R.

260—410.7